United States Patent
Hutcheon et al.

(10) Patent No.: US 11,953,089 B1
(45) Date of Patent: Apr. 9, 2024

(54) SHAFT ROTATION SPEED AND DIRECTION SENSING

(71) Applicant: GM GLOBAL TECHNOLOGY OPERATIONS LLC, Detroit, MI (US)

(72) Inventors: Angela M Hutcheon, Shelby Township, MI (US); Joel H Gunderson, Canton, MI (US); Roman Shestakov, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/162,923

(22) Filed: Feb. 1, 2023

(51) Int. Cl.
| | | |
|---|---|---|
| *G01P 3/481* | (2006.01) | |
| *F16H 3/64* | (2006.01) | |
| *F16H 57/02* | (2012.01) | |
| *F16H 59/42* | (2006.01) | |

(52) U.S. Cl.
CPC .............. *F16H 59/42* (2013.01); *F16H 3/64* (2013.01); *F16H 57/02* (2013.01); *G01P 3/481* (2013.01); *F16H 2057/02026* (2013.01); *F16H 2057/02043* (2013.01); *F16H 2200/2012* (2013.01); *F16H 2200/2046* (2013.01)

(58) Field of Classification Search
CPC ....... F16H 57/08; F16H 57/0018–0031; F16H 3/62–66; F16H 2200/2002–2028; G01P 3/44–4956
See application file for complete search history.

(56) References Cited

U.S. PATENT DOCUMENTS

| | | | | |
|---|---|---|---|---|
| 6,066,065 | A * | 5/2000 | Breen | F16H 3/54 475/299 |
| 2005/0057244 | A1* | 3/2005 | McCarrick | G01P 3/488 324/173 |
| 2007/0298932 | A1* | 12/2007 | Yoneyama | F16H 61/12 477/120 |
| 2009/0247343 | A1* | 10/2009 | Hart | F16H 61/0009 475/276 |
| 2013/0012350 | A1* | 1/2013 | Ebner | B60K 7/0007 475/149 |
| 2013/0218426 | A1* | 8/2013 | Li | G01L 3/101 701/51 |
| 2016/0299169 | A1* | 10/2016 | Heuver | F16H 3/44 |
| 2018/0045750 | A1* | 2/2018 | McGuire | G01P 3/487 |
| 2023/0258262 | A1* | 8/2023 | Hutcheon | G01P 3/44 475/158 |

* cited by examiner

*Primary Examiner* — Ernesto A Suarez
*Assistant Examiner* — Lillian T Nguyen
(74) *Attorney, Agent, or Firm* — Lorenz & Kopf LLP

(57) ABSTRACT

A transmission system associated with a vehicle includes a shaft to rotate about an axis of rotation. The shaft is coupled to a gear set. The transmission system includes a target wheel to be coupled to the gear set and to rotate with the gear set. The target wheel includes at least one void. The transmission system includes a giant magnetoresistance (GMR) sensor spaced apart from the target wheel by a gap. The giant magnetoresistance (GMR) sensor is configured to observe the at least one void of the target wheel to determine a rotation speed of the shaft based on a giant magnetoresistance (GMR) effect. The transmission system further includes a rotating shell located in the gap between the target wheel and the giant magnetoresistance (GMR) sensor.

14 Claims, 7 Drawing Sheets

SHAFT ROTATION SPEED AND DIRECTION SENSING

INTRODUCTION

The technical field generally relates to systems for sensing a speed and direction of a rotating shaft, and more particularly relates to systems for sensing a speed and direction of a rotating shaft associated with a transmission of a vehicle.

In the example of a vehicle, a transmission transmits power from the engine to the vehicle wheels at selectable speed ratios. In the example of an automatic transmission, the transmission may include a torque converter, which transfers torque from an output shaft of the engine to an input shaft of the transmission. Due to the torque converter, the input shaft may rotate at a speed that is different than the output shaft of the engine. Generally, the transmission switches between various gear ratios based on a rotation speed of the input shaft. In order to determine the rotation speed of the input shaft, a sensor may be employed to observe the input shaft as it rotates. Due to the construction of the transmission, however, it may be difficult to observe the input shaft as it rotates.

Thus, it is desirable to provide systems for shaft rotation speed and direction sensing, which enable a sensor to observe a rotation of a shaft, such as an input shaft associated with a transmission, to determine a speed and direction of the rotation of the shaft. Furthermore, other desirable features and characteristics will become apparent from the subsequent detailed description and the appended claims, taken in conjunction with the accompanying drawings and the foregoing introduction.

SUMMARY

According to various embodiments, provided is a transmission system associated with a vehicle. The transmission system includes a shaft configured to rotate about an axis of rotation. The shaft is coupled to a gear set. The transmission system includes a target wheel to be coupled to the gear set and to rotate with the gear set. The target wheel includes at least one void. The transmission system includes a giant magnetoresistance (GMR) sensor spaced apart from the target wheel by a gap. The giant magnetoresistance (GMR) sensor is configured to observe the at least one void of the target wheel to determine a rotation speed of the shaft based on a giant magnetoresistance (GMR) effect. The transmission system further includes a rotating shell located in the gap between the target wheel and the giant magnetoresistance (GMR) sensor.

In exemplary embodiments of the transmission system, the target wheel defines an axis, and wherein the at least one void extends in a radial direction with respect to the axis. In such embodiments, the at least one void may include adjacent voids that are distanced from one another in a circumferential direction with respect to the axis. In such embodiments, the adjacent voids may be spaced evenly apart about a perimeter of the target wheel.

In exemplary embodiments of the transmission system, the at least one void includes voids that are separated from one another by ferrous material.

In exemplary embodiments of the transmission system, the target wheel is devoid of magnets. In such embodiments, the target wheel may be composed of a ferromagnetic material. In such embodiments, the target wheel may be composed of a ferrous material.

In exemplary embodiments of the transmission system, the non-ferrous shell is configured to rotate about the axis of rotation.

In exemplary embodiments of the transmission system, the gear set is a planetary gear set including a carrier coupled to a planet gear and to the shaft, and the target wheel includes at least one coupling flange that extends radially inward to be coupled to the carrier of the planetary gear set.

In exemplary embodiments of the transmission system, the at least one void is completely surrounded by a wall of the target wheel.

In another embodiment, a vehicle includes: a transmission system including a shaft and a shell configured to rotate about an axis of rotation, the shaft including a planetary gear set coupled to the shaft configured to rotate with the shaft; and a shaft sensing system configured to observe a rotation of the shaft about the axis of rotation, the shaft sensing system including: a sensor target coupled to the planetary gear set associated with the shaft, the sensor target including at least one ferrous region and at least one non-ferrous region and devoid of one or more magnets; and a giant magnetoresistance (GMR) sensor spaced apart from the sensor target by a gap, the giant magnetoresistance (GMR) sensor configured to generate a magnetic field and to observe the sensor target to determine a rotation speed of the shaft, wherein the shell is located in the gap.

In exemplary embodiments of the vehicle, the shaft is an input shaft of the transmission system.

In exemplary embodiments, the vehicle further includes a non-ferrous torque transfer housing positioned within the gap between the giant magnetoresistance (GMR) sensor and the sensor target, and the non-ferrous torque transfer housing is configured to rotate independently of the shaft.

In exemplary embodiments of the vehicle, the giant magnetoresistance (GMR) sensor is coupled to a housing associated with the transmission system, and the giant magnetoresistance (GMR) sensor extends along a sensor axis about perpendicular to the axis of rotation of the shaft.

In exemplary embodiments of the vehicle, the at least one ferrous region of the sensor target is composed of a ferrous material, and the at least one non-ferrous region of the sensor target is formed by a void in the sensor target.

In another embodiment, a vehicle includes a transmission system including a shaft configured to rotate about an axis of rotation, the shaft including a planetary gear set having a carrier coupled to a planet gear and to the shaft; a shaft sensing system configured to observe a rotation of the shaft about the axis of rotation, the shaft sensing system including: a target wheel coupled to the carrier of the planetary gear set and configured to rotate with the carrier of the planetary gear set, the target wheel composed of a ferrous material and at least partially bounding non-ferrous regions spaced evenly apart about a perimeter of the target wheel, wherein the target wheel is devoid of one or more magnets; and a giant magnetoresistance (GMR) sensor spaced apart from the target wheel by a gap, the giant magnetoresistance (GMR) sensor configured to generate a magnetic field and to observe the target wheel to determine a rotation speed of the shaft.

In exemplary embodiments, the vehicle further includes a non-ferrous torque transfer housing positioned within the gap between the giant magnetoresistance (GMR) sensor and the target wheel, and the non-ferrous torque transfer housing is configured to rotate independently of the shaft.

In exemplary embodiments of the vehicle, the giant magnetoresistance (GMR) sensor is coupled to a housing associated with the transmission system, and the giant magnetoresistance (GMR) sensor extends along a sensor axis about perpendicular to the axis of rotation of the shaft.

In exemplary embodiments of the vehicle, the target wheel includes at least one coupling flange that extends radially inward to be coupled to the shaft.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
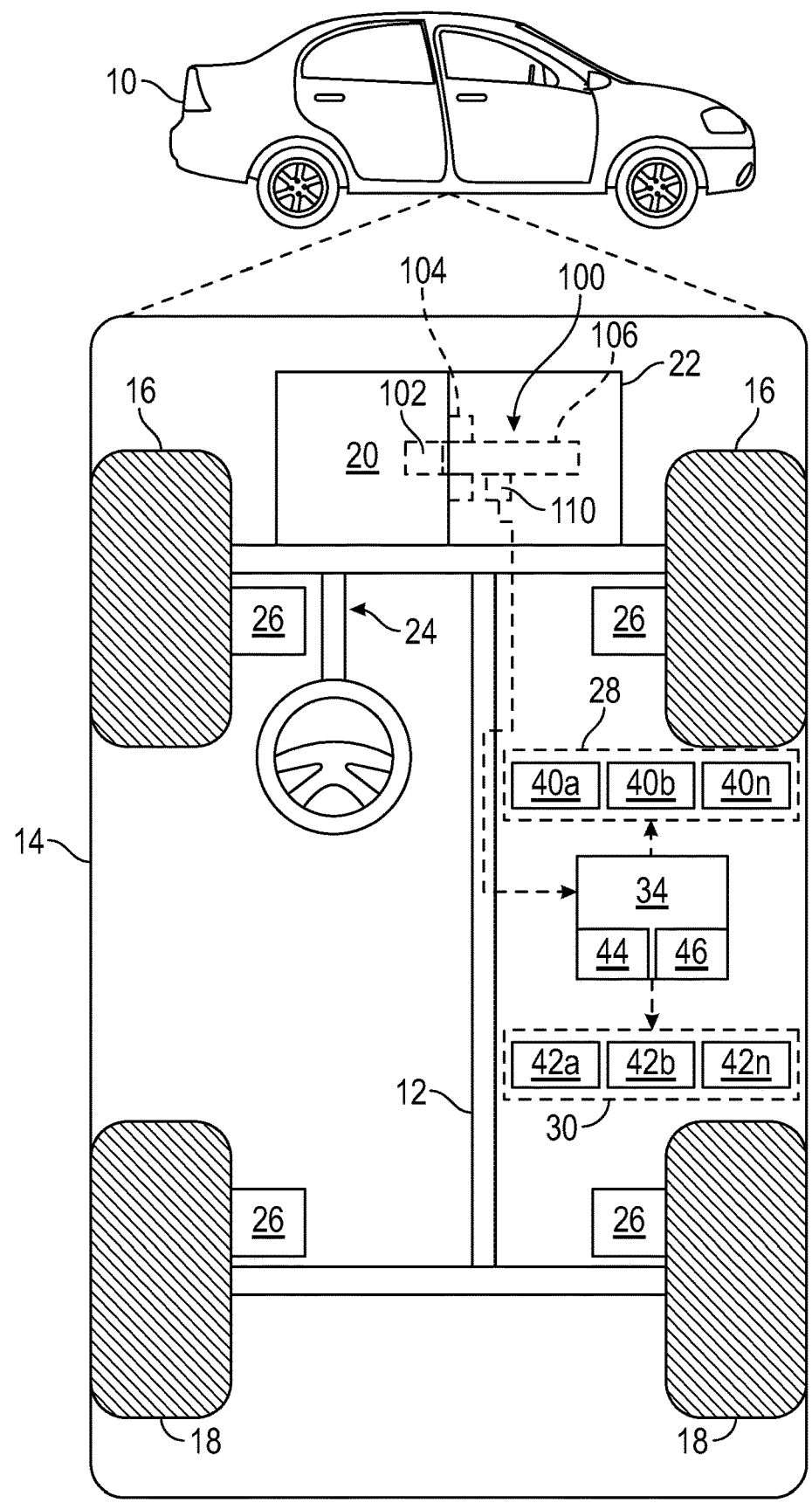
FIG. 1 is a functional block diagram illustrating a vehicle including a transmission system having a shaft sensing system in accordance with various embodiments.

The following detailed description is merely exemplary in nature and is not intended to limit the application and uses. Furthermore, there is no intention to be bound by any expressed or implied theory presented in the preceding introduction, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the shaft sensing system described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. Also, as used herein, the term "about" denotes within 5% to account for manufacturing tolerances.

With reference to FIG. 1, a shaft sensing system shown generally as 100 is associated with a vehicle 10 in accordance with various embodiments. In general, the shaft sensing system 100 observes a speed and direction of rotation of a rotating shaft, such as an input shaft 106 of a transmission system 22, and generates sensor signals for use in controlling the transmission system 22 of the vehicle 10. As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16, 18 are each rotationally coupled to the chassis 12 near a respective corner of the body 14.

In various embodiments, the vehicle 10 is an autonomous vehicle or a semi-autonomous vehicle. As can be appreciated, the shaft sensing system 100 can be implemented in other non-autonomous systems and is not limited to the present embodiments. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

As shown, the vehicle 10 generally includes a propulsion system 20, the transmission system 22, a steering system 24, a brake system 26, a sensor system 28, an actuator system 30, and at least one controller 34. The propulsion system 20 may, in various embodiments, include an internal combustion engine, an electric machine such as a traction motor, and/or a fuel cell propulsion system. The propulsion system 20 generally has an output shaft or crankshaft 102, which is coupled to the transmission system 22. The transmission system 22 is configured to transmit power received from the crankshaft 102 of the propulsion system 20 to the wheels 16, 18 according to selectable speed ratios.

The brake system 26 is configured to provide braking torque to the wheels 16, 18. Brake system 26 may, in various embodiments, include friction brakes, brake by wire, a regenerative braking system such as an electric machine, and/or other appropriate braking systems. The steering system 24 influences a position of the wheels 16 and/or 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. In various embodiments, the sensing devices 40a-40n include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter.

The actuator system 30 includes one or more actuator devices 42a-42n that control one or more vehicle features such as, but not limited to, the propulsion system 20, the transmission system 22, the steering system 24, and the brake system 26. In various embodiments, the vehicle 10 may also include interior and/or exterior vehicle features not illustrated in FIG. 1, such as various doors, a trunk, and cabin features such as air, music, lighting, touch-screen display components (such as those used in connection with a navigation system), and the like.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling systems of the vehicle 10. The controller 34 is in communication with the shaft sensing system 100 via a communication medium that facilitates the transfer of data, power, etc.

It is noted that FIG. 1 illustrates an input shaft 106 and crank shaft 102 that are aligned co-planar with the drawing sheet, indicating a transversely mounted transmission. However, embodiments herein are provided for use with transversely mounted transmissions or longitudinally mounted transmissions. In fact, in the following, illustrated embodiments include longitudinally mounted transmissions.

Figure 2:
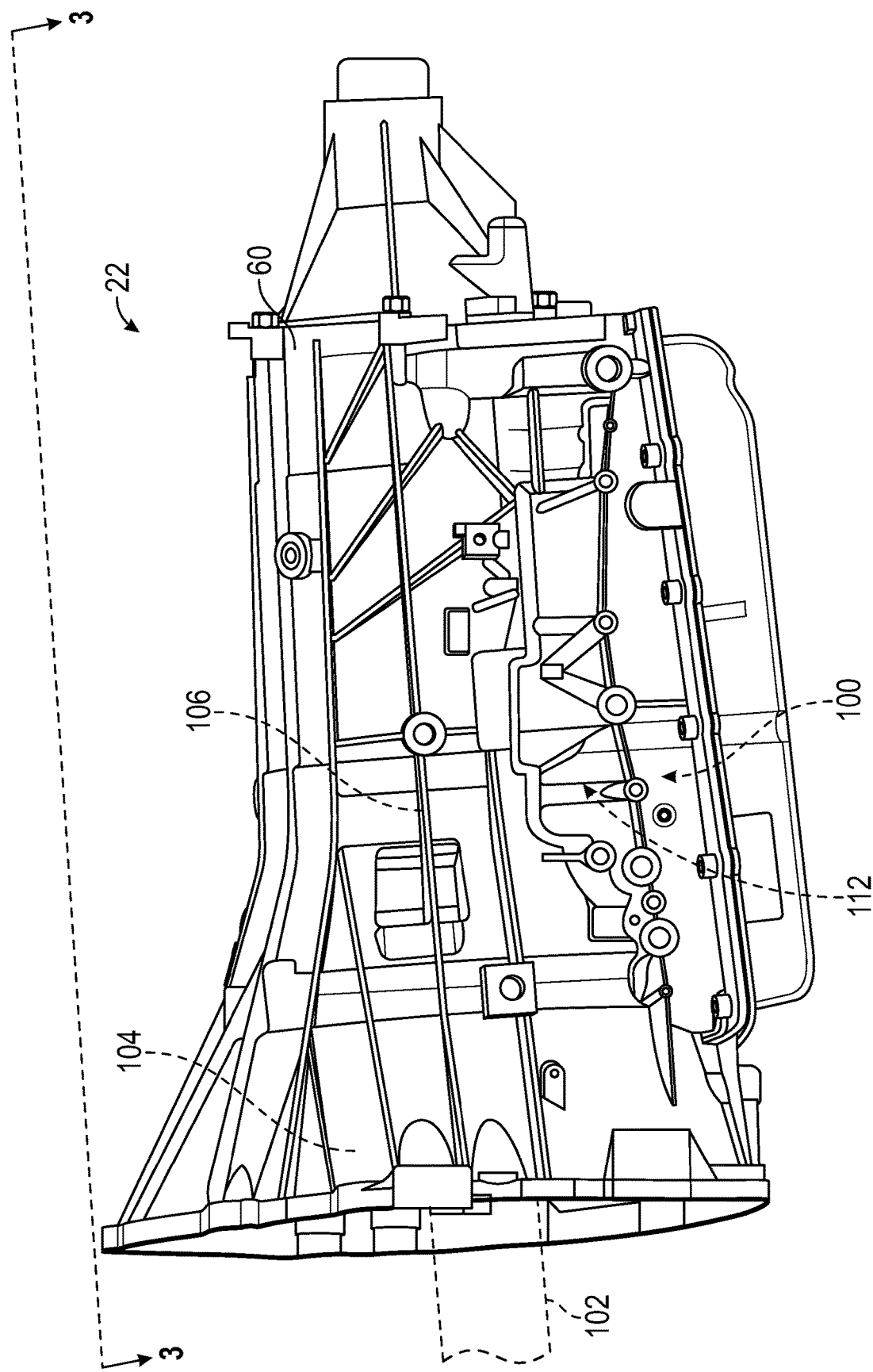
FIG. 2 is a perspective view of the transmission system of FIG. 1, in which the shaft sensing system is disposed within a case of the transmission system.

With reference to FIG. 2, a perspective view of the transmission system 22 is shown. According to various embodiments, the transmission system 22 is a ten speed automatic transmission. The transmission system 22 includes a torque converter 104, which is coupled to the crankshaft 102 of the propulsion system 20. The torque converter 104 enables the propulsion system 20 to move independently of the transmission system 22, and uses torque received from the crankshaft 102 to drive an input shaft 106 of the transmission system 22. Thus, the crankshaft 102 of the propulsion system 20 may be rotating at a speed different than the speed of the input shaft 106 due to the torque converter 104. The shaft sensing system 100, which is disposed within a case 60 of the transmission system 22, enables the determination of the rotation speed of the input shaft 106 to ensure the proper selection of gears within the transmission system 22.

Figure 3:
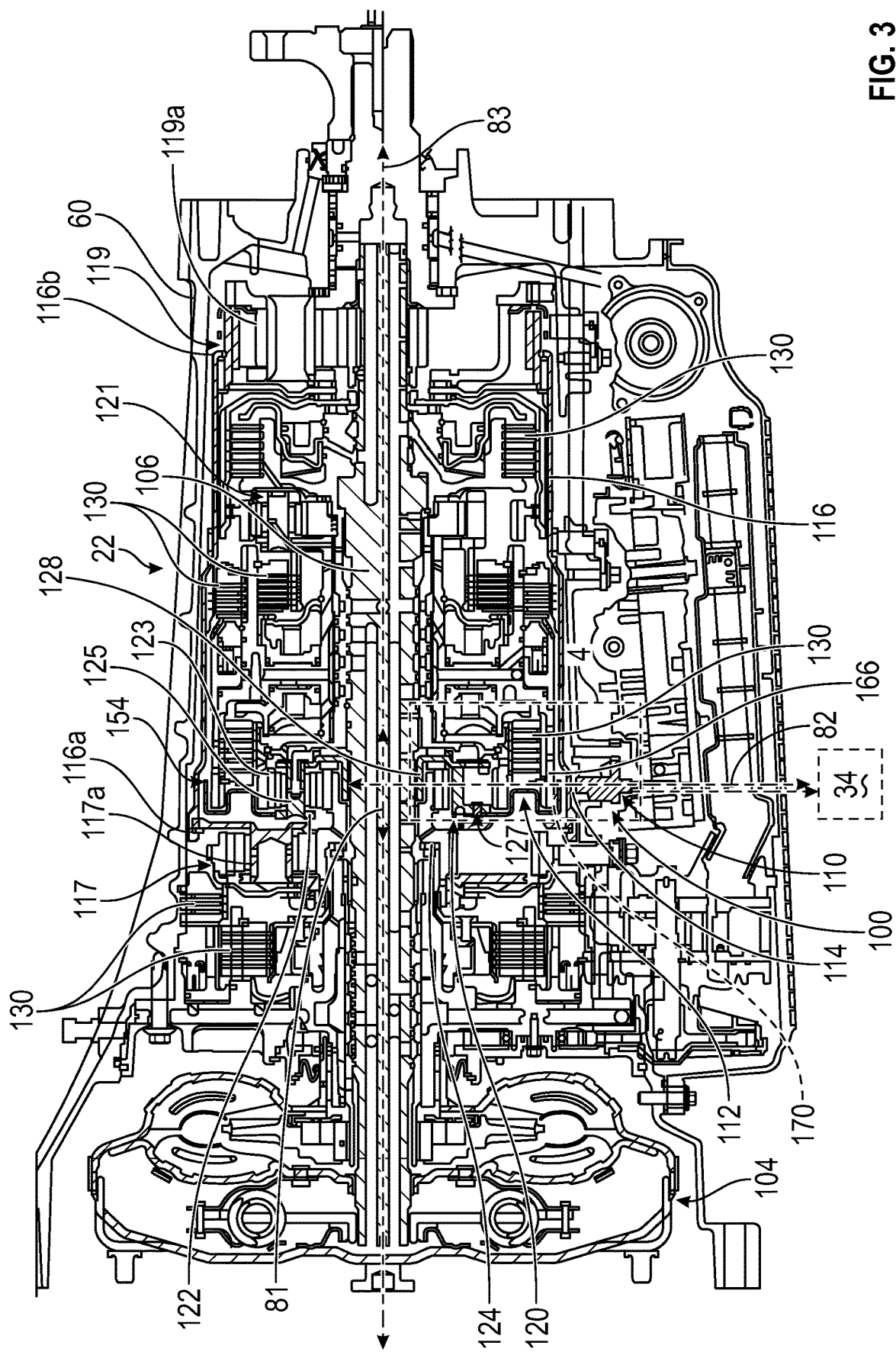
FIG. 3 is a cross-sectional view of the transmission system of FIG. 2, taken along line 3-3 of FIG. 2.

With reference to FIG. 3, a cross-sectional view of the transmission system 22 is shown. The transmission system 22 includes a plurality of planetary gear sets 117, 119, 120, 121 and a plurality of clutches 130 that cooperate to supply power to the wheels 16 and/or 18 (FIG. 1). In one example, the transmission system 22 includes four planetary gear sets 117, 119, 120, 121 and six clutches 130. The planetary gear sets 117, 119, 120, 121 cooperate with the clutches 130 of the transmission system 22 to transfer torque from the input shaft 106 to drive the wheels 16 and/or 18. In this example, the shaft sensing system 100 is associated with one of the planetary gear sets 117, 119, 120, 121 to determine the rotation speed and direction of the input shaft 106.

Figure 4:
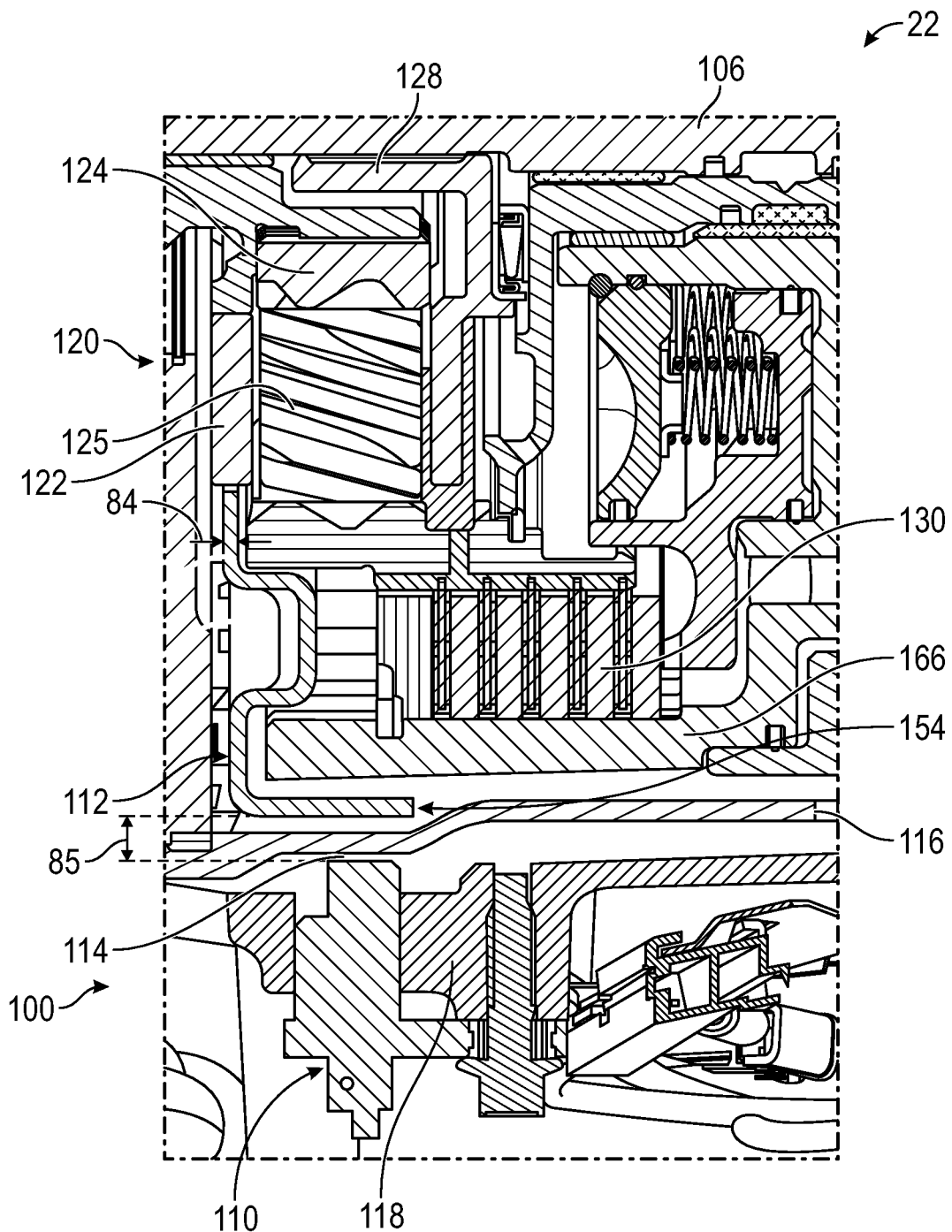
FIG. 4 is a detailed view of the transmission system of FIG. 3.

In one example, the shaft sensing system 100 includes a sensor 110 and a sensor target 112 or target wheel 112. Due to the configuration and arrangement of the transmission system 22, in this example and with reference to FIG. 4, the sensor 110 is spaced apart from the target wheel 112 by a radial distance 85. In exemplary embodiments, the radial distance 85 is from 2 to 5 millimeters (mm), such as from 2.38 to 4.57 millimeters (mm). The radial distance 85 defines an air gap 114 between the sensor 110 and the target wheel 112. In addition, disposed within the air gap 114 between the sensor 110 and the target wheel 112 is a transmission torque transfer housing 116 or shell 116. The transmission torque transfer housing 116 is cylindrical, and surrounds a portion of the transmission system 22. The transmission torque transfer housing 116 rotates independently of the target wheel 112 and may be considered to be a rotating shell 116. The transmission torque transfer housing 116 is composed of a non-ferrous metal or metal alloy, including, but not limited to aluminum. In this example, the sensor 110 observes the target wheel 112 through the transmission torque transfer housing 116. The transmission torque transfer housing 116 results in a metallic barrier between the sensor 110 and the target wheel 112. The transmission torque transfer housing 116 is coupled to a planet 117a of the planetary gear set 117 at one end 116a, and is coupled to a planet 119a of the planetary gear set 119 at a second, opposite end 116b. The transmission torque transfer housing 116 carries torque from the planetary gear set 117 to the planetary gear set 119.

The sensor 110 observes the target wheel 112 and generates sensor signals based on the observation. In one example, the sensor 110 detects a change in a magnetic flux at the sensor 110. In this example, the sensor 110 is a giant magnetoresistance (GMR) sensor. An exemplary giant magnetoresistance (GMR) sensor 110 includes a fixed, back biased magnet with a magnetic force that creates a magnetic field. The sensor 110 generates sensor signals based on the change in the magnetic flux observed by the sensor 110. As the sensor 110 is back biased, the sensor 110 includes one or more magnets that generate a magnetic field. In one example, the sensor 110 includes one or more rare earth magnets to generate the magnetic field. The sensor 110 is in communication with the controller 34 over the communication media to transmit the sensor signals to the controller 34 and to receive power from the controller 34. Based on the sensor signals, the controller 34 is configured to determine the rotation speed and direction of the input shaft 106. Alternatively, the sensor 110 may include a processor and a storage media, which may determine the rotation speed and direction of the input shaft 106 locally, at the sensor 110, and may transmit the determination to the controller 34. The sensor 110 is coupled to a transmission case 118 associated with the transmission system 22. Generally, the sensor 110 is coupled to the transmission case 118 so as to extend along an axis 82, which is about perpendicular to an axis 83 of the input shaft 106 (FIG. 3). The input shaft 106 rotates about the axis 83 and the axis 83 is an axis of rotation for the input shaft 106. The sensor 110 observes the change in the magnetic flux as a portion of the target wheel 112 rotates relative to the sensor 110. Generally, a sensor housing of the sensor 110 is configured such that a minimal thickness of the sensor housing is disposed between the sensor 110 and the target wheel 112.

With reference back to FIG. 3, the target wheel 112 is coupled to the planetary gear set 120. The planetary gear set 120 is rotatable independently of the planetary gear set 117 and the planetary gear set 119. The planetary gear set 120 includes a carrier 122, a ring gear 123, a sun gear 124 and one or more planet gears 125. The target wheel 112 is coupled to the carrier 122 via one or more rivets 127, however, any suitable mechanical fastener may be employed. The carrier 122 is coupled to each of the planet gears 125, via one or more mechanical fasteners, such as bolts, etc. The carrier 122 is also coupled to the input shaft 106 via splines 128. The carrier 122 rotates with and at the same speed as the input shaft 106. Thus, a rotation of the carrier 122 and the target wheel 112 coupled to the carrier 122 is directly proportional to the rotation speed of the input shaft 106.

Figure 5:
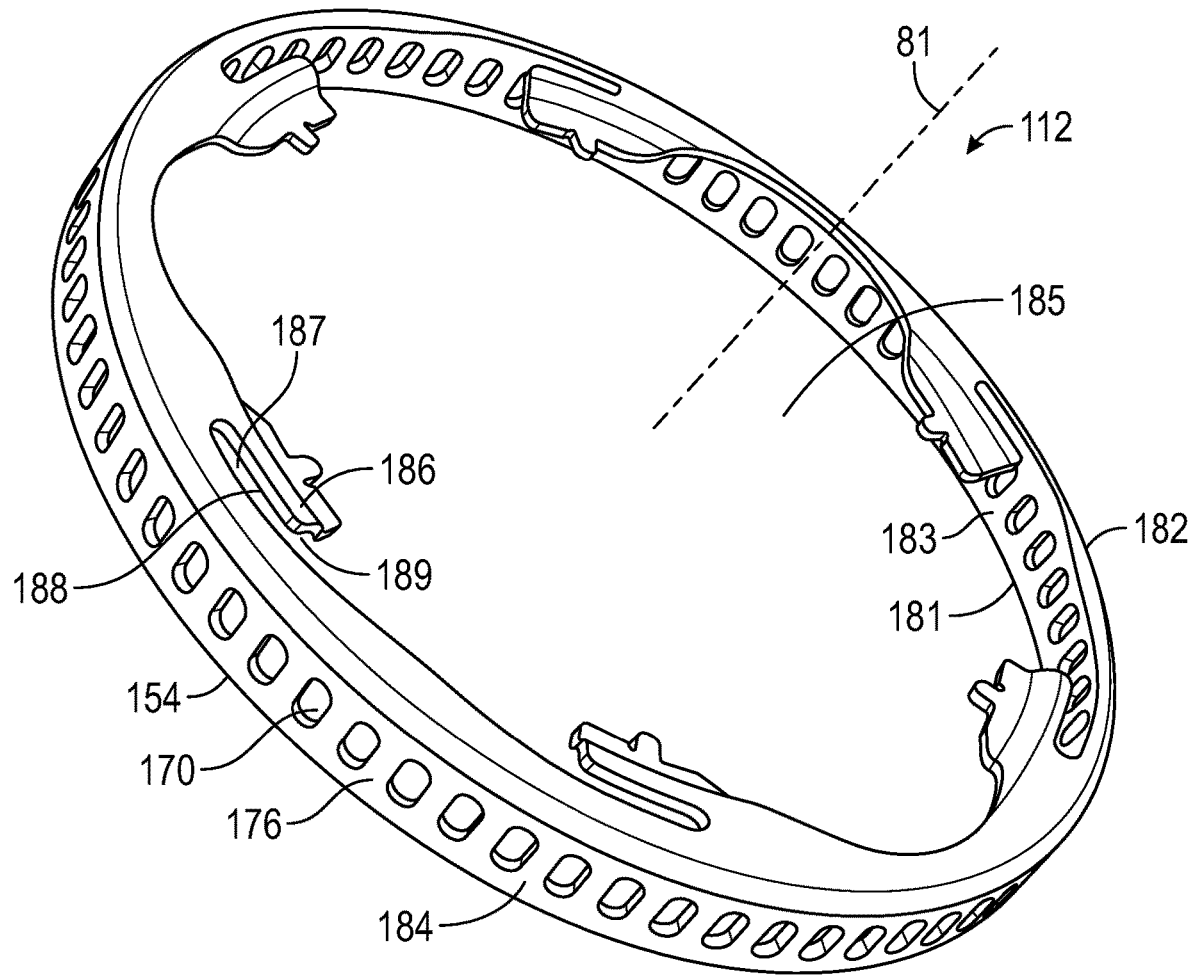
FIG. 5 is a perspective view of a target wheel of the shaft sensing system according to an embodiment.

The target wheel 112 is observable by the sensor 110 to determine the rotation speed and direction of the input shaft 106. With reference to FIG. 5, a perspective view of an embodiment of a target wheel 112 is shown. The target wheel 112 is annular, and is composed of a ferromagnetic material, such as a ferrous metal or metal alloy, for example steel 1010.

It should be noted that as the sensor 110 is a giant magnetoresistance (GMR) sensor, the target wheel 112 is composed of a ferrous material, but does not include or is devoid of any magnets, which provides a weight savings and reduces manufacturing complexity. In this regard, as the target wheel 112 does not include one or more magnets to generate a magnetic field, the target wheel 112 is manufacturable through stamping, casting, additive manufacturing, etc. Generally, the target wheel 112 is formed as one-piece and is monolithic. An exemplary target wheel 112 is formed from a single material. An exemplary target wheel 112 has a thickness 84 (FIG. 4), and in one example, the thickness 84 is about 1.0 millimeters (mm) to about 3.0 millimeters (mm) or to about 1.5 millimeters (mm).

As shown in FIG. 5, an exemplary target wheel 112 includes an annular peripheral wall 154 that extends parallel to and in the direction of the central axis 81. The annular peripheral wall 154 extends in the axial direction between, and terminates at, end 181 and end 182. The annular peripheral wall 154 extends radially between, and terminates at, inner surface 183 and outer surface 184. In exemplary embodiments, the peripheral wall 154 is cylindrical.

As shown, the target wheel 112 is formed with a central opening 185, which enables the target wheel 112 to be positioned about the input shaft 106. The central opening 185 extends in the direction of the central axis 81 and is bounded by the peripheral wall 154 from the end 181 to the end 182.

As shown, the target wheel 112 further includes at least one or a plurality of coupling flanges 186 that extend radially inward toward the central axis 81 from the inner surface 183 at the end 182 of the peripheral wall 154. In exemplary embodiments, each coupling flange 186 is substantially perpendicular to the central axis 81. Further, in exemplary embodiments, each coupling flange 186 extends in a circumferential direction, with respect to the central axis 81, to define an open groove 187 between an edge 188 of the coupling flange 186 and the inner surface 183 of the end 182 of the peripheral wall 154. As shown, each open groove 187 is in communication with the central opening 185 via a mouth 189.

In exemplary embodiments, adjacent pairs of coupling flanges 186 extend toward one another circumferentially such that the mouths 189 of adjacent open grooves 187 face one another as shown. In the illustrated example, the target wheel 112 has six coupling flanges 186, arranged in three pairs, spaced apart about an inner surface 183 of the target wheel 112, however, the target wheel 112 may have any number of coupling flanges 186.

The target wheel 112 is symmetric relative to a central axis 81 of the target wheel 112 in this example. The central axis 81 is coaxial with the axis 83 of the input shaft 106 (FIG. 3).

The annular peripheral wall 154 of the target wheel 112 includes a plurality of targets 170. In one example, the targets 170 are formed as a plurality of enclosed voids or windows that define open areas or non-ferrous areas of the annular peripheral wall 154. However, it should be understood that the targets 170 may be formed between a plurality of teeth that are spaced apart to define open voids, i.e., voids that are not completely enclosed on all sides, that define non-ferrous areas of the annular peripheral wall 154. In this example, the annular peripheral wall 154 includes about twenty windows to about eighty windows, and in one example, includes about sixty windows to about seventy windows. Generally, a larger number of the targets 170, i.e., windows, increases a resolution of the sensor 110.

Figure 6:
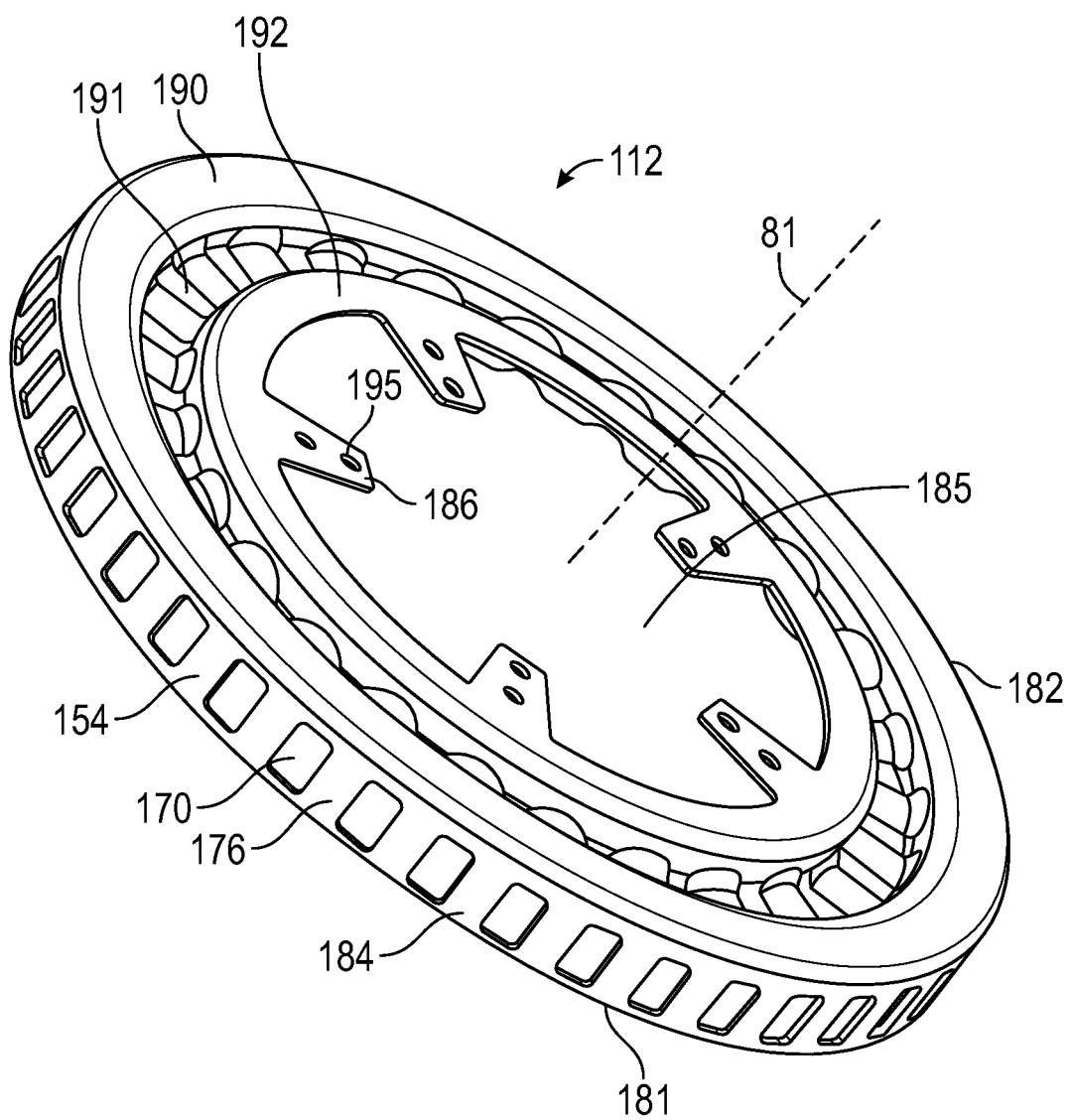
FIG. 6 is a perspective view of a target wheel of the shaft sensing system according to another embodiment.

FIG. 6 illustrates another embodiment of the target wheel 112 observable by the sensor 110 to determine the rotation speed and direction of the input shaft 106. Again, the target wheel 112 includes an annular peripheral wall 154 that extends parallel to and in the direction of the central axis 81. The annular peripheral wall 154 extends in the axial direction between, and terminates at, end 181 and end 182. The annular peripheral wall 154 extends radially between, and terminates at, inner surface (hidden in the perspective of FIG. 6) and outer surface 184. In exemplary embodiments, the peripheral wall 154 is cylindrical.

As shown, the target wheel 112 is formed with a central opening 185, which enables the target wheel 112 to be positioned about the input shaft 106. The central opening 185 extends in the direction of the central axis 81 and is bounded by the peripheral wall 154 from the end 181 to the end 182.

In the embodiment of FIG. 6, the target wheel 112 further includes an annular shoulder 190 that extends radially inward toward the central axis 81 from the inner surface 183 at the end 182 of the peripheral wall 154. The shoulder 190 may be formed with an annular groove 191 that extends to a raised inner ring portion 192.

As shown, the target wheel 112 further includes at least one or a plurality of coupling flanges 186 that extend radially inward toward the central axis 81 from the shoulder 190. In exemplary embodiments, each coupling flange 186 is substantially perpendicular to the central axis 81. As shown, each coupling flange 186 is formed with bores 195. The bores 195 assist in locating the target wheel 112 on the planetary gear set 120 (FIG. 3). Each of the bores 195 may receive a corresponding one of the rivets 127 (FIG. 3) to couple the target wheel 112 to the planetary gear set 120 (FIG. 3). In one example, the target wheel 112 is coupled to the carrier 122 so as to be disposed between the transmission torque transfer housing 116 and a clutch housing 166. The clutch housing 166 is composed of a non-ferrous metal or metal alloy, including, but not limited to, aluminum. The clutch housing 166 cooperates to partially enclose one of the clutches 130 associated with the transmission system 22.

In the illustrated example, the target wheel 112 has five coupling flanges 186, spaced apart about an inner surface of the target wheel 112, however, the target wheel 112 may have any number of coupling flanges 186.

The annular peripheral wall 154 of the target wheel 112 includes a plurality of targets 170. In one example, the targets 170 are formed as a plurality of enclosed voids or windows that define non-ferrous areas of the annular peripheral wall 154. However, it should be understood that the targets 170 may be formed between a plurality of teeth that are spaced apart to define open voids, i.e., voids that are not completely enclosed on all sides, that define non-ferrous areas of the annular peripheral wall 154. In this example, the annular peripheral wall 154 includes about twenty targets 170 to about eighty targets 170, and in one example, includes about sixty windows to about seventy windows. Generally, a larger number of the targets 170, i.e., voids/windows, increases a resolution of the sensor 110.

Figure 7:
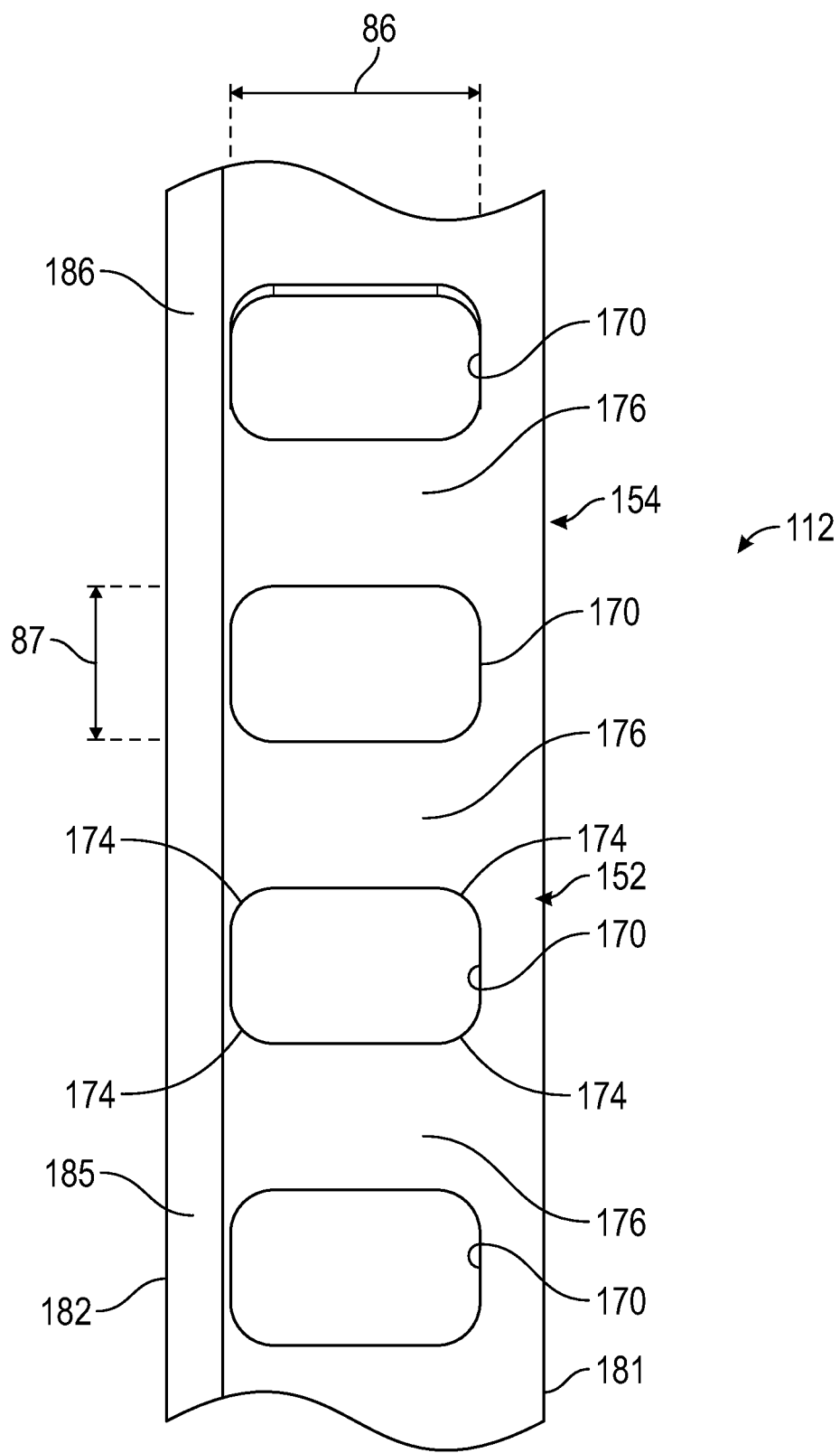
FIG. 7 is a side view of the target wheel of the shaft sensing system, taken along a radial line to the axis of the target wheel.

Cross-referencing FIG. 5, FIG. 6, and FIG. 7, it may be seen that the targets 170 are spaced apart about the perimeter of the annular peripheral wall 154. The targets 170 are generally rectangular, and each target 170 has a width 87 that may be different than a length 86 of the target 170. In certain embodiments, the width 87 is less than the length 86. In certain embodiments, the width 87 is greater than the length 86. In certain embodiments, the width 87 is equal to the length 86. In one example having forty targets 170, the width 87 is about 7 millimeters (mm) to about 9 millimeters (mm) and the length 86 is about 11 millimeters (mm) to about 13 millimeters (mm). For example, the width 87 may be 7.93 mm and the length 86 may be 12 mm. In one example having twenty targets 170, the width 87 is about 15 millimeters (mm) to about 17 millimeters (mm) and the length 86 is about 11 millimeters (mm) to about 13 millimeters (mm). For example, the width 87 may be 15.86 mm and the length 86 may be 12 mm.

In the illustrated example, each of the targets 170 has rounded corners or fillets 174, which interconnect walls of the targets 170. It should be noted, however, that the targets 170 may have any desired shape to define a non-ferrous area in the annular peripheral wall 154. With reference to FIG. 3, the targets 170 of the annular peripheral wall 154 are defined through the annular peripheral wall 154 such that a center of each of the targets 170 is coaxial with the sensor axis 82 of the sensor 110. This enables the targets 170 to be observed by the sensor 110 in instances where the target wheel 112 moves axially relative to the sensor 110 (in a direction parallel to the axis of rotation 83 of the input shaft 106). Moreover, the width 87 and the length 86 of each of the targets 170 is predetermined to ensure that in the instance of a movement of the target wheel 112 axially relative to the sensor 110 (in a direction parallel to the axis of rotation 83 of the input shaft 106), the targets 170 are observed by the sensor 110.

The targets 170 may be formed concurrently during the formation of the target wheel 112, via additive manufacturing or casting, or may be formed by stamping or machining in a secondary operation. Because the targets 170 are spaced apart about the perimeter or circumference of the annular peripheral wall 154, ferrous sections 176 of the annular peripheral wall 154 are defined between adjacent ones of the targets 170. In one example, the targets 170 are evenly spaced apart about the perimeter of the annular peripheral wall 154. One of the ferrous sections 176 of the annular peripheral wall 154 alternates with one of the targets 170 about the perimeter or circumference of the annular peripheral wall 154. By providing the windows or targets 170 that are devoid of ferrous material, as the annular peripheral wall 154 rotates with the input shaft 106, the sensor 110 observes the change in magnetic flux caused by the non-ferrous target 170 passing over or in front of the sensor 110. Generally, as the number of targets 170 about the perimeter of the annular peripheral wall 154 or the number of targets 170 per revolution is known, the controller 34 is configured to determine the rotation speed and direction of the input shaft 106 based on a number of changes in the magnetic flux (caused by the targets 170 passing over the sensor 110) observed over a predetermined unit of time.

In view of the above, the voids or targets 170 may be considered to be non-ferrous regions, while the ferrous sections 176 may be considered to be ferrous regions. An exemplary target wheel 112 includes alternating non-ferrous and ferrous regions to provide for speed and direction detection by the giant magnetoresistance (GMR) sensor 110.

The giant magnetoresistance (GMR) sensor 110 detects the speed and direction of rotation of the target wheel 112, and indirectly of the input shaft 106, via the large change in electrical resistance that is induced by the application of a magnetic field to thin films composed of alternating ferromagnetic and nonmagnetic layers within the giant magnetoresistance (GMR) sensor 110. This change in resistance is related to the field-induced alignment of the magnetizations of the magnetic layers. When the non-ferrous targets 170 and ferrous sections 176 successively pass over the sensor 110, the magnetic field is affected, resulting in a measurable change in resistance.

In one example, in order to assemble the target wheel 112 to the input shaft 106, with reference to FIG. 3, the target wheel 112 is formed to include the targets 170. With the planetary gear sets 117, 119, 120, 121 coupled to the input shaft 106, the target wheel 112 is positioned about the input shaft 106. The rivets 127 are inserted into the coupling flanges 186 to couple the target wheel 112 to the carrier 122 of the planetary gear set 120. The sensor 110 is coupled to the transmission case 118 such that the sensor axis 82 is aligned with a center of one of the targets 170 of the annular peripheral wall 154, and the sensor 110 is placed in communication with the controller 34. The torque converter 104 is coupled to the input shaft 106. The remainder of the transmission system 22 is assembled, and the transmission system 22 is installed in the vehicle 10 such that the crankshaft 102 (FIG. 2) is coupled to the torque converter 104.

With the shaft sensing system 100 assembled and installed within the vehicle 10, during the operation of the vehicle 10, the sensor 110 generates the magnetic field. As the propulsion system 20 turns the crankshaft 102, the torque converter 104 adapts the torque from the crankshaft 102 to drive the input shaft 106. As the input shaft 106 rotates, the carrier 122 of the planetary gear set 120 rotates with the input shaft 106 at the same speed as the input shaft 106. As the target wheel 112 is coupled to the carrier 122 of the planetary gear set 120, the target wheel 112 rotates at the same speed as the input shaft 106. As the target wheel 112 rotates, the sensor 110 observes the changes in the magnetic flux caused by the targets 170 of the annular peripheral wall 154 passing over the sensor 110 through the transmission torque transfer housing 116. The radial thickness of torque transfer housing 116 may be optimized to make the performance of the system sufficient for use in the intended application. Specifically, minimizing gap 114 (distance 85) and minimizing the thickness of torque transfer housing 116 in the vicinity situated between sensor 110 and target 112 may provide for improved operability in determining the rotation speed of the input shaft 106 and/or the rotation direction.

Generally, as the targets 170 pass over the sensor 110, the magnetic flux changes, which results in a pulse generated by the sensor 110. The controller 34 determines the rotation speed of the input shaft 106 based on the number of pulses received per predetermined unit of time given the known number of targets 170 per revolution. Further, the controller may determine the rotation direction based on analysis of a pulse width modulation (PWM) signal from the sensor 110.

Thus, the shaft sensing system 100 enables the sensor 110 to observe a rotation of the input shaft 106 indirectly via the planetary gear set 120 and to generate sensor signals that indicate the speed and direction of the input shaft 106 efficiently. By providing the giant magnetoresistance (GMR) sensor 110, the target wheel 112 does not need to include magnets and is not magnetized, which reduces a weight of the target wheel 112 and also reduces manufacturing complexity associated with the target wheel 112. Moreover, the shaft sensing system 100 enables an accurate detection of the direction and the rotation speed of the input shaft 106 even through the transmission torque transfer housing 116 and the large air gap 114. In addition, by providing the target wheel 112 devoid of magnets, eddy currents generated within the torque transfer housing 116 are reduced, which reduces an amount of energy lost as heat. This reduction in eddy currents and energy loss may also improve a fuel economy of the vehicle 10. Further, by providing the target wheel 112 without magnets, the target wheel 112 may be more robust and durable during operation of the vehicle 10.

The giant magnetoresistance (GMR) sensor 110 provides greater magnetic field detection capability than anisotropic magnetoresistance (AMR) or Hall effect sensors, through detection of magnetic field changes that result when non-ferrous voids and ferrous sections (or teeth) of the target wheel pass through the magnetic field of the fixed, back biased magnet of the giant magnetoresistance (GMR) sensor 110. The giant magnetoresistance (GMR) sensor 110 is able to detect the spinning target in a vehicle's automatic transmission application despite the presence of the non-ferrous spinning shell between the sensor's magnet and the target. Specifically, while the presence of the non-ferrous spinning shell creates eddy currents that obscure the magnetic disturbance, the giant magnetoresistance (GMR) sensor 110 has sufficient sensitivity when the design of the related transmission components is optimized to make speed detection possible through the range of operation and manufacturing tolerances. Further, the giant magnetoresistance (GMR) sensor 110 may be provided with an optimal chip programming scheme to make speed detection possible through the range of operation and manufacturing tolerances.

Generally, the transmission components should run true enough with sufficient balance and stiffness to allow elements 112, 116 and 110 to operate within the minimized gap 114 without interference with each other. As noted above, minimizing gap 114 and the local thickness of housing 116 may provide for sufficient magnetic signal strength for sensor 110 to operate sufficiently for the exemplary embodiment described.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A transmission system associated with a vehicle, comprising:
    a first planetary gear set;
    a second planetary gear set;
    a third planetary gear set;
    a shaft configured to rotate about an axis of rotation, the shaft coupled to the first planetary gear set;
    a target wheel coupled to the gear set and configured to rotate with the gear set, the target wheel including at least one void;
    a giant magnetoresistance (GMR) sensor spaced apart from the target wheel by a gap, the giant magnetoresistance (GMR) sensor configured to observe the at least one void of the target wheel to determine a rotation speed of the shaft based on a giant magnetoresistance (GMR) effect; and
    a rotating shell located in the gap between the target wheel and the giant magnetoresistance (GMR) sensor, wherein the shell is coupled directly to a second planet gear of the second planetary gear set and directly to a third planet gear of the third planetary gear set and is configured to rotate independently of the shaft.

2. The transmission system of claim 1, wherein the target wheel defines an axis, and wherein the at least one void extends in a radial direction with respect to the axis.

3. The transmission system of claim 2, wherein the at least one void comprises adjacent voids that are distanced from one another in a circumferential direction with respect to the axis.

4. The transmission system of claim 3, wherein the adjacent voids are spaced evenly apart about a perimeter of the target wheel.

5. The transmission system of claim 1, wherein the at least one void comprises voids, and wherein the voids are separated from one another by ferrous material.

6. The transmission system of claim 5, wherein the target wheel is composed of a ferromagnetic material.

7. The transmission system of claim 1, wherein the target wheel is devoid of magnets.

8. The transmission system of claim 7, wherein the target wheel is composed of a ferrous material.

9. The transmission system of claim 1, wherein the rotating shell is configured to rotate about the axis of rotation.

10. The transmission system of claim 1, wherein the at least one void is completely surrounded by a wall of the target wheel.

11. A vehicle, comprising:
 a transmission system including:
  a first planetary gear set;
  a second planetary gear set;
  a third planetary gear set;
  a shaft coupled to the first planetary gear set; and
  a shell configured to rotate about an axis of rotation, wherein the shell is directly connected to a second planet gear of the second planetary gear set and directly connected to a third planet gear of the third planetary gear set; and
 a shaft sensing system configured to observe a rotation of the shaft about the axis of rotation, the shaft sensing system including:
  a sensor target coupled to the first planetary gear set associated with the shaft, the sensor target including at least one ferrous region and at least one non-ferrous region and devoid of one or more magnets; and
  a giant magnetoresistance (GMR) sensor spaced apart from the sensor target by a gap, the giant magnetoresistance (GMR) sensor configured to generate a magnetic field and to observe the sensor target to determine a rotation speed of the shaft,
 wherein the shell is located in the gap, and wherein the shell is configured to rotate independently of the shaft.

12. The vehicle of claim 11, wherein the shaft is an input shaft of the transmission system.

13. The vehicle of claim 11, wherein the giant magnetoresistance (GMR) sensor extends along a sensor axis about perpendicular to the axis of rotation of the shaft.

14. The vehicle of claim 11, wherein the at least one ferrous region of the sensor target is composed of a ferrous material, and wherein the at least one non-ferrous region of the sensor target is formed by a void in the sensor target.

* * * * *